United States Patent [19]

Cohnen et al.

[11] 4,301,212

[45] Nov. 17, 1981

[54] SCRATCH-RESISTANT AND WEATHER-RESISTANT LAMINATES BASED ON POLYCARBONATE

[75] Inventors: Wolfgang Cohnen, Leverkusen; Frank Kleiner, Cologne; Gerhard Kranz, Moers, all of Fed. Rep. of Germany

[73] Assignee: Bayer Aktiengesellschaft, Bayerwerk, Fed. Rep. of Germany

[21] Appl. No.: 911,740

[22] Filed: Jun. 2, 1978

[30] Foreign Application Priority Data

Jun. 4, 1977 [DE] Fed. Rep. of Germany ....... 2725317

[51] Int. Cl.$^3$ ............................................. B32B 27/36
[52] U.S. Cl. ................................... 428/412; 428/421; 528/196; 156/280
[58] Field of Search ................ 428/412, 421; 528/196; 156/280

[56] References Cited

U.S. PATENT DOCUMENTS

| | | | |
|---|---|---|---|
| 3,582,398 | 6/1971 | Ringler | 428/412 |
| 3,681,167 | 8/1972 | Moore | 428/412 |
| 3,762,940 | 10/1973 | Bechtold | 428/412 |
| 3,843,390 | 10/1974 | Hudson | 428/412 |
| 4,018,941 | 4/1977 | Tucker | 428/412 |
| 4,082,894 | 4/1978 | Yoshida | 428/412 |

*Primary Examiner*—George F. Lesmes
*Assistant Examiner*—E. Rollins Buffalow
*Attorney, Agent, or Firm*—Gene Harsh; Lawrence S. Pope; Thomas W. Roy

[57] ABSTRACT

The present invention relates to a clear and transparent, scratch-resistant and weather-resistant laminate of high impact strength, consisting of a polycarbonate layer which, on at least one of its surfaces, carries a polyacrylate coating which, on its outer surface, is coated with a scratch-resistant and weather-resistant covering of a hydroxylated fluoropolymer which is cross-linked with methylmelamine and/or polysilicic acid. The present invention also relates to a process for the production of said scratch-resistant laminate.

19 Claims, No Drawings

SCRATCH-RESISTANT AND WEATHER-RESISTANT LAMINATES BASED ON POLYCARBONATE

BACKGROUND OF THE INVENTION

Polycarbonate moldings have a combination of outstanding properties; high light transmission, high impact strength and a high heat distortion point. The disadvantage of polycarbonate moldings and moldings consisting of all other thermoplastics is their relatively low scratch resistance. Because of the low scratch resistance of these thermoplastics, when they are used in practice many fine scratches which cause optical opaqueness and reduced transparency appear in the surface.

It is known to provide polycarbonate moldings with a polyacrylate coating. This can be effected industrially by coating the polycarbonate moldings with a lacquer based on polyacrylate as described in German Published Patent No. 1,694,273. The coating can also be carried out by pressing polycarbonate sheets together with polyacrylate films under the influence of heat as described in German Published Patent No. 1,953,276.

By coating polycarbonate moldings in this manner, although the system can indeed be provided with a weather-resistant finish, especially if the polyacrylate film applied to the polycarbonate contains a UV absorber, the scratch resistance remains virtually unchanged.

It is also known that polycarbonate moldings can be coated with a scratch-resistant layer based on hydroxylated fluoropolymers crosslinked with methylmelamine. According to one embodiment, as described in German Published Patent No. 1,963,278, this polymer can contain up to 60% by weight of silicon dioxide, relative to the combined weight of silicon dioxide and crosslinked polymer.

The disadvantage of these polycarbonate moldings thus coated is the inadequate stability of these coatings towards weathering. The scratch resistance and the adhesion of the coating decreases after even a very short weathering time. The silicon dioxide-modified coatings are indeed somewhat more weather-resistant than the silicon dioxide-free coatings. Nevertheless, the stability towards weathering of these must also be described as deficient.

As described in German Published Patent No. 1,963,278, it is also known that polyacrylate moldings can be coated with a scratch-resistant covering of a hydroxylated chloropolymer crosslinked with methylmelamine. These coatings on polyacrylate moldings are scratch-resistant and stable towards weathering. The disadvantage of this laminate, however, is the low impact strength.

SUMMARY OF THE INVENTION

The present invention thus relates to a clear and transparent, scratch-resistant and weather-resistant laminate of high impact strength, consisting of polycarbonate as the substrate which has, on at least one of its surfaces, a polyacrylate film which carries a coating based on a crosslinked fluoropolymer. In particular, according to the instant invention, the polyacrylate film carries a coating based on a hydroxylated fluoropolymer crosslinked with methylmelamine.

Uncoated polycarbonate moldings have such high impact strengths that test pieces molded therefrom remain "unbroken" according to DIN No. 53,453. Polyacrylate moldings, on the other hand, have considerably lower impact strengths and exhibit values of 14–26 $kJ/m^2$ when tested. Polycarbonate moldings coated with polyacrylate have an impact strength which is considerably lower than that of the uncoated polycarbonate moldings.

It has now surprisingly been found that polycarbonate moldings coated with polyacrylate have a very high impact strength if the polyacrylate coating has an additional coating of a melamine-modified hydroxylated fluoropolymer on its outer surface.

The polyacrylate film can have a thickness of between about 0.010 and about 1.25 mm and the coating consisting of a methylmelamine crosslinked hydroxylated fluoropolymer can have a thickness of about 0.005 to about 0.5 mm.

This invention also relates to a process for the production of a scratch-resistant laminate, in which, either continuously or discontinuously, a polyacrylate coating is first applied to the polycarbonate moldings and a coating of a hydroxylated fluoropolymer crosslinked with methylmelamine is then applied to this acrylate covering. This can be effected by first coating the polycarbonate moldings with a polyacrylate lacquer and, after the lacquer has hardened, carrying out the treatment with a fluoropolymer covering solution. If desired, it is also possible to first bond the polyacrylate films to the polycarbonate substrate on one or both sides of the polycarbonate and then to cover the polyacrylate layer with the fluoropolymer. The laminate according to the invention can also be produced by bonding a polyacrylate film, coated with the fluoropolymer on one side, to the polycarbonate substrate under elevated pressure and elevated temperature in a manner such that the fluoropolymer coating faces outwards.

The adhesion between the polyacrylate film and polycarbonate substrate can be achieved in a press under the influence of heat and pressure. If desired, the polyacrylate film can be applied to polycarbonate sheets by pressing the acrylate film and the polycarbonate sheet together through the nip of a pair of rolls which are heated. For the purpose of effective bonding, the temperature applied should be at least about 160° C. and the pressure should be at least about 1.4 $kg/cm^2$. The higher the temperature is, the shorter is the time required and the lower is the pressure required.

DETAILED DESCRIPTION OF THE INVENTION

Possible polycarbonates in the sense of the invention are polycondensation products obtainable by reacting diphenols, in particular dihydroxydiarylalkanes, with phosgene or diesters of carbonic acid, and of the unsubstituted dihydroxydiarylalkanes, those having aryl radicals which carry methyl groups or halogen atoms in the o-position and/or m-position relative to the hydroxyl group are also suitable. Branched polycarbonates are also suitable.

The polycarbonates have mean weight-average molecular weights $\overline{M}w$ between about 10,000 and about 100,000, preferably between about 20,000 and about 40,000, determined by measuring the relative viscosity in a concentration of 0.5% by weight of $CH_2Cl_2$ at 25° C.

Examples of suitable diphenols are hydroquinone, resorcinol, 4,4'-dihydroxydiphenyl, bis-(hydroxyphenyl)-alkanes, such as, for example, $C_1$–$C_8$-alkyleneand $C_2$–$C_8$-alkylidene-bisphenols, bis-(hydroxyphenyl)-cycloalkanes, such as, for example, $C_5$–$C_{15}$-cycloalkylene- and $C_5$–$C_{15}$-cycloalkylidene-bisphenols, and bis-(hydroxyphenyl) sulphides, ethers, ketones, sulphoxides or sulphones. Furthermore, $\alpha,\alpha'$-bis-(hydroxyphenyl)-diisopropylbenzene as well as the corresponding nuclear-alkylated and nuclear-halogenated compounds are suitable according to the instant invention.

Polycarbonates based on 2,2-bis-(4-hydroxyphenyl)-propane (bisphenol A), 2,2-bis-(4-hydroxy-3,5-dichloro-phenyl)-propane (tetrachlorobisphenol A), 2,2-bis-(4-hydroxy-3,5-dibromo-phenyl)-propane (tetrabromobisphenol A), 2,2-bis-(4-hydroxy-3,5-dimethyl-phenyl)-propane (tetramethylbisphenol A) and 1,1-bis-(4-hydroxyphenyl)-cyclohexane (bisphenol Z), and those based on trinuclear bisphenols, such as $\alpha, \alpha'$-bis-(4-hydroxyphenyl)-p-diisopropylbenzene, are preferred.

Further diphenols suitable for the preparation of the polycarbonate are described in U.S. Pat. Nos. 2,970,131, 2,991,273, 2,999,835, 2,999,846, 3,014,891, 3,028,365, 3,062,781, 3,148,172, 3,271,367, 3,271,368 and 3,280,078.

The polyacrylate film used according to the invention and the lacquer, used according to the invention, based on polyacrylate can consist of any polyacrylate or polymethacrylate. Polyacrylates and polymethacrylates are homopolymers and copolymers of acrylic acid ester and methacrylic acid ester, having molecular weights of between about $10^3$ and $10^7$ and having about 4 to 18 C atoms in the monomer unit, such as, for example, polyacrylic acid isobutyl ester, polymethacrylic acid methyl ester, polymethacrylic acid ethylhexyl ester, polyacrylic acid ethyl ester, copolymers of various acrylic acid esters and/or methacrylic acid esters, such as, for example, methacrylic acid methyl ester/acrylic acid cyclohexyl ester copolymers, and furthermore copolymers of acrylic acid esters and/or methacrylic acid esters with crosslinking agents, such as, for example, 1,4-butanediol dimethacrylate, glycol dimethacrylate, triglycol dimethacrylate, trimethylolpropane trimethacrylate, allyl methacrylate, and triallyl cyanurate, and furthermore copolymers of acrylic acid esters and/or methacrylic acid esters with styrene and/or $\alpha$-methylstyrene, as well as the graft polymers and copolymers and polymer mixtures composed of acrylic esters, methacrylic acid esters, styrene and butadiene. The molecular weights of the polyacrylates and polymethacrylates are to be understood as average number molecular weights $\overline{M}n$ measured for example by endgroup analysis.

The hydroxylated fluoropolymer covering composition, crosslinked with methyl-melamine, according to the invention is a crosslinked polymer consisting of fluorine-containing polymer chains which carry a number of oxygen-methylmelamine bonds, the oxygen being bonded to a carbon atom in the skeleton of the fluorine-containing polymer chain or to a side-chain and the carbon atom carrying at least one hydrogen atom, the chains containing at least about 20% by weight of fluorine and being crosslinked by the oxygen-methylmelamine bonds, characterized in that fluorine is located in the skeleton of the polymer chain, each polymer chain having a unit weight of not more than about 700 per oxygen atom in the crosslinked oxygen-methylmelamine bond and the methylmelamine of the oxygen-melamine bond having the following formula:

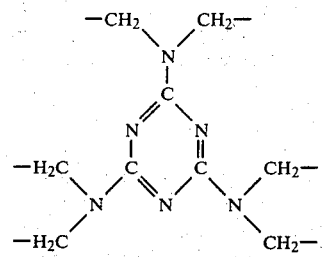

wherein at least two of the $CH_2$ groups are bonded to the oxygen atom in the crosslinked oxygen/methylmelamine bond.

The hydroxylated fluoropolymer can be crosslinked with polysilicic acid instead of methylmelamine. Both crosslinking possibilities can also be used simultaneously. The fluoropolymers crosslinked with polysilicic acid should contain a maximum of about 60% by weight of silicon dioxide, relative to the total weight of crosslinking agent and crosslinked polymer.

The polymer chain of the polymer crosslinked with methylmelamine arises from fluorine-containing monomer units, preferably tetrafluoroethylene or chlorotrifluoroethylene, and optionally from copolymerized fluorine-free, ethylenically unsaturated monomer units, the units containing oxygen bonded to methylmelamine.

The fluorine-free, ethylenically unsaturated monomer unit is preferably derived from a hydroxyalkyl vinyl ether, for example hydroxybutyl vinyl ether, 2-hydroxypropyl vinyl ether or 6-hydroxyhexyl vinyl ether, or vinyl acetate.

The methylmelamine in the sense of the invention is preferably derived from hexa-(methoxy-methyl)-melamine or hexa-(cyclohexyloxymethyl)-melamine.

The laminate according to the invention can contain either clear and transparent colorless as well as transparent colored individual layers, or translucent colored or opaque colored individual layers.

The present invention is described in more detail by the following examples:

EXAMPLES

EXAMPLE A

Preparation of a covering solution of a hydroxylated fluoropolymer crosslinked with methylmelamine.

(a) Preparation of the hydroxylated fluoropolymer 5,500 ml of tert.-butyl alcohol, 26 g of anhydrous potassium carbonate, 330 g of 4-hydroxybutyl vinyl ether, 0.9 g of azoisobutyrodinitrile and 390 kg of tetrafluoroethylene were put into an 8 l reactor and heated to 65° C. for 3.5 hours, while stirring, during which the pressure fell from an initial value of about 9.8 kg/cm² to 3.9 kg/cm².

After cooling, the white solid copolymer was precipitated from the clear colorless solution by adding water. After filtering off the product, washing with water and drying in air, a white solid copolymer with a fluorine content of 35.5% was obtained. The copolymer was soluble in methanol.

(b) Preparation of the covering solution consisting of the hydroxylated fluoropolymer according to (a) and hexamethoxymethylmelamine.

500 g of methyl isoamyl ketone, 500 g of toluene, 1,000 g of acetic acid, 146 g of hexamethoxymethylmelamine and 12 g of a 20% strength p-toluenesulphonic acid solution in isopropanol were added to 3,000 g of a 14.65% strength solution of the copolymer (a) described above in methanol. To this solution were also added 5 g of silicone oil to prevent the orange peel effect (obtaining rough surfaces are called in the art "orange peel effect") and 20 g of 2(2'-hydroxy-5'-methylphenyl)-benzotriazole to stabilize the solution against the action of UV light.

EXAMPLE B

Preparation of a covering solution consisting of a hydroxylated fluoropolymer which can be crosslinked with polysilicic acid.

A hydrolyzed ethyl silicate solution was prepared by treating 100 g of tetraethylorthosilicate with 69.5 g of anhydrous ethanol and 22.5 g of 0.1 N hydrochloric acid. After aging for 24 hours, a 120 g portion of this solution was mixed with 102 g of methyl isoamyl ketone and the mixture was heated at 32° under reduced pressure until the weight of the residue was 120 g.

Most of the ethanol was removed by this measure and a solution of polysilicic acid in methyl isoamyl ketone remained. The silicon dioxide content was calculated as 15%.

A (tetrafluoroethylene/4-hydroxybutyl vinyl ether)-/silicon dioxide covering composition (ratio 60:40) was prepared by mixing 200 g of the above polysilicic acid solution with 164 g of tetrahydrofurane and 136 g of a 33% strength solution of the hydroxylated fluoropolymer (a) in methanol.

EXAMPLE 1:

Polymethyl methacrylate

Sheets of polymethyl methacrylate having a thickness of 4.0 mm were immersed in the solution described above under Example A for two minutes, withdrawn at a rate of about 15 cm/minute and subjected to heat treatment at 135° for one hour. The resulting covering was hard, colorless, glossy and transparent.

After hardening, the covering had a thickness of about 8μ. The adhesion, measured by the Gitterschnitt method, was 100%. The data are given in Table 1.

For comparison, uncoated polymethyl methacrylate sheets 4.0 mm thick were also measured. The data are in Table 1.

EXAMPLE 2:

Polycarbonate 2.1 Polycarbonate coated with a covering solution according to Example A Sheets made of polycarbonate based on bisphenol A with a relative solution viscosity ($\eta$ rel.) of 1.31, measured according to DIN No. 7,746, and a thickness of 4.0 mm were coated. The covering solution according to Example A was applied at a rate of 40 cm/minute with the aid of a film applicator. The covering was hardened at 135° C. for 17 hours.

After hardening, the covering had a thickness of about 12μ. Table 1 contains the properties.

2.2 Polycarbonate coated with (1.) a covering solution according to Example A as the primer and (2.) with a covering solution according to Example B as the finish.

Sheets made of polycarbonate based on bisphenol A ($\eta_{rel}$=1.31) with a thickness of 4.0 mm were immersed in the covering solution according to Example A for 2 minutes and withdrawn at a rate of about 30 cm/minute and the covering was hardened at 160° C. for 30 minutes to give a primer covering. After cooling to room temperature, the sheets were immersed in the covering solution according to Example B for 2 minutes and withdrawn at a rate of 30 cm/minute and the covering was hardened at 160° C. for 2 hours.

Table 1 contains the test results.

Similar uncoated polycarbonate sheets were also tested for comparison with Examples 2.1 and 2.2 (for the result see Table 1).

EXAMPLE 3:

Polycarbonate coated with a covering based on polymethyl methacrylate

Sheets made of polycarbonate based on bisphenol A ($\eta_{rel}$=1.31) 4.0 mm thick were immersed for 2 minutes in the following covering solution: 25% by weight of polymethyl methacrylate, 30% by weight of toluene, 30% by weight of 1,2-dichloroethane and 15% by weight of methyl ethyl ketone.

After slowly withdrawing the sheets from the solution, they were left in air at room temperature for 24 hours and the covering was then hardened at 105° C. for 2 hours. After cooling, the properties were determined. They are given in Table 1.

EXAMPLE 4:

Polycarbonate coated with a covering based on polymethyl methacrylate as the primer and with a covering according to Example A as the finish.

Polycarbonate sheets coated according to Example 3 were immersed in the covering solution according to Example A for 2 minutes and removed from the solution at a rate of 40 cm/minute and the covering was hardened at 135° C. for 1 hour. The resulting covering was hard, colorless and transparent and had a high gloss.

The test results are in Table 1.

EXAMPLE 5:

Polycarbonate, laminated with polymethyl methacrylate on both sides and then coated with the covering from Example A.

A polymethyl methacrylate/polycarbonate/polymethacrylate laminate was produced during the extrusion of polycarbonate, based on bisphenol A ($\eta_{rel}$=1.31) at a fusion temperature of 280° C. via a sheet die. Polymethyl methacrylate films having a thickness of 0.025 mm were applied to the surfaces of the extruded polycarbonate sheet with the aid of rolls in a manner such that continuous production became possible. This was achieved by passing the 4.0 mm thick polycarbonate sheet and the two polymethyl methacrylate films through the nip of a pair of rolls in a manner such that the films covered the two outer surfaces of the polycarbonate sheet. The temperature of the rolls was adjusted to 60° C.; the temperature of the extruded polycarbonate sheet was 160° C. at the point where it flows together with the polymethyl methacrylate and the pressure of the two rolls against one another was 1.4 kg/cm.

The laminates thus prepared were tested. The results are given in Table 1.

Laminates as described above were immersed in the covering solution according to Example A for 2 minutes and removed from the solution at a rate of 15 cm/minute and the covering was hardened at 135° C. for 1 hour.

The test results are given in Table 1.

EXAMPLE 6:

Polycarbonate, laminated with polymethyl methacrylate on one side and then coated with the covering from Example A.

A laminate of this type made of polycarbonate based on bisphenol A ($\eta_{rel}=1.31$) was produced as described in Example 5. The extruded polycarbonate sheet had a thickness of 4.0 mm; the polymethyl methacrylate film has a thickness of 0.05 mm. The sheet and film were passed through the same nip.

Sheets thus prepared were coated, on the polymethyl methacrylate side, with the covering solution of Example A using a film applicator. The rate of drawing off was 40 cm/minute. The coating was then hardened at 135° C. for 1 hour.

The laminated uncoated plates described above and the laminated coated plates were tested. The table contains the results.

EXAMPLE 7:

Polycarbonate, laminated with a polymethyl methacrylate film coated on one side.

A polymethyl methacrylate film 1.0 mm thick was coated with the covering solution of Example A using a film applicator. The rate of drawing off was 15 cm per minute. The coating was then hardened at 135° C. for 1 hour. The films thus coated were cut into pieces 15×20 cm in size. Polycarbonate sheets 4.0 thick with the same surface measurements were laminated on one side with the acrylate films in a heat-sealing press in a manner such that the coating faced outwards.

The laminate was obtained under the following conditions: temperature: 160° C.; pressure: 35 kg/cm²; time: 5 minutes.

After cooling, the properties of the laminate sheets were tested. Table 1 contains the values.

Explanation of the data in Table 1.

1. Scratch resistance—steel wool test

The scratch resistance of the coverings towards steel wool was determined by rubbing a small pad (1–2 cm²) of steel wool backwards and forwards 20 times over the same area of the covering, applying a force of 250–300 g per square centimeter of the steel wool pad. The covering was then examined with respect to the scratching and was evaluated as follows:

| | |
|---|---|
| Severe scratches over the entire area | 0 - none |
| About 75% of the areas rubbed shows scratches | 1 - poor |
| about 50% of the area rubbed shows scratches | 2 - satisfactory |
| about 25% of the area rubbed shows scratches | 3 - good |
| very few visible scratches | 4 - very good |
| no visible scratches | 5 - outstanding |

2. Scratch resistance—silicon carbide drop test (ASTM-D-613-44)

The scratch resistance according to the silicon carbide drop test was determined by first measuring the opaqueness according to ASTM D 1,003 and, after sprinkling the surfaces of the test pieces with 1,000 g of silicon carbide particles from a height of 63 cm, the opaqueness was again determined. The difference between the opaqueness values is given in the table.

3. The adhesion of the coverings was determined with the aid of the Gitterschnitt test (DIN 5,315).

The symbols in the table have the following meanings:

0 very good adhesion
1 good adhesion
2 moderate adhesion
3 poor adhesion
4 very poor adhesion 4. The resistance of the coverings to weathering was determined with the aid of a carbon arc weathering apparatus (ASTM E-42-57). The scratch resistance and adhesion of the coverings were measured before and after a synthetic weathering in the 2,000 position.

5. The light transmission was determined according to DIN 5,036.

6. The impact strength was measured according to DIN 53,453 using test pieces 6 mm wide which were worked out of the 4 mm thick sheets. p 12 test pieces were measured in each case, and the values were determined. In the case of test pieces coated on one side, the coating was in the zone of tensile stress during testing.

TABLE 1

Properties of the Examples

| | | | | Before weathering | | | After weathering | | |
|---|---|---|---|---|---|---|---|---|---|
| No. | Laminate | Impact strength (kJ/m²) | Light transmission | scratch resistant steel wool test | scratch resistant silicon carbide test | Adhesion Gitterschnitt | scratch resistant steel wool test | scratch resistant silicon carbide test | Adhesion Gitterschnitt |
| 1 | Polymethyl methacrylate coated with A | 19 | 88 | 5 | 1.2 | 0 | 5 | 1.5 | 0 |
|   | Polymethyl methacrylate uncoated | 18 | 88 | 0 | 48 | — | 0 | 52 | — |
| 2 | Polycarbonate - coated with A | unbroken | 86 | 3–4 | 4.2 | 2–3 | 0 | 57 | 3–4 |
|   | Polycarbonate - coated with A + B | unbroken | 85.5 | 4 | 3.7 | 0 | 2–3 | 38 | 4 |
|   | Polycarbonate - uncoated | unbroken | 86 | 0 | 51 | — | 0 | 69 | — |
| 3 | Polycarbonate - coated with polymethyl methacrylate lacquer | 65 | 86.5 | 0–1 | 54 | 0 | 0 | 57 | 0 |
| 4 | Polycarbonate - coated with polymethyl methacrylate lacquer with A | unbroken | 86 | 5 | 1.3 | 0 | 5 | 1.7 | 0 |

TABLE 1-continued

| | | Properties of the Examples | | | | | | | |
|---|---|---|---|---|---|---|---|---|---|
| | | | | | | | Before weathering | After weathering | |
| No. | Laminate | Impact strength (kJ/m$^2$) | Light transmission | scratch resistant steel wool test | scratch resistant silicon carbide test | Adhesion Gitterschnitt | scratch resistant steel wool test | scratch-resistant silicon carbide test | Adhesion Gitterschnitt |
| 5 | Polycarbonate - laminated on both sides with polymethyl methacrylate film | 35 | 86.5 | 0–1 | 50 | 0 | 0 | 53 | 0 |
| | Polycarbonate - laminated on both sides with polymethyl methacrylate film and coated on both sides with A | unbroken | 86 | 5 | 1.4 | 0 | 5 | 1.5 | 0 |
| 6 | Polycarbonate - laminated on one side with polymethyl methacrylate film and coated on the polymethyl methacrylate side with A | unbroken | 86 | 5 | 1.2 | 0 | 5 | 1.5 | 0 |
| | Polycarbonate - laminated on one side with polymethyl methacrylate film, uncoated | 55 | 86 | 0 | 53 | — | 0 | 57 | — |
| 7 | Polycarbonate - pressed together, on one side, with polymethyl methacrylate film, coated with A, under the influence of heat | unbroken | 86 | 5 | 1.3 | 0 | 5 | 1.4 | 0 |

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A laminate comprising a polycarbonate layer which carries, on at least one of its surfaces, an uncrosslinked polyacrylate layer having a coating of a hydroxylated fluoropolymer crosslinked with methylmelamine, polysilicic acid or both on its outer surface.

2. The laminate according to claim 1, wherein the fluoropolymer is a hydroxylated fluoropolymer crosslinked with methylmelamine.

3. The laminate according to claim 2, wherein the hydroxylated fluoropolymer, crosslinked with methylmelamine, is comprised of fluorine-containing polymer chains crosslinked by oxygen-methylmelamine bonds whereby (i) the oxygen is bonded to a carbon atom in the skeleton of the polymer chains or to a side chain,
    (ii) said carbon atom carries at least one hydrogen atom,
    (iii) at least about 20% by weight of fluorine is present in the skeleton of the polymer chain,
    (iv) each polymer chain has a unit weight of not more than about 700 per oxygen atom in the crosslinked oxygen-methylmelamine bond, and
    (v) the methylmelamine of the oxygen-methylmelamine bond had the following formula

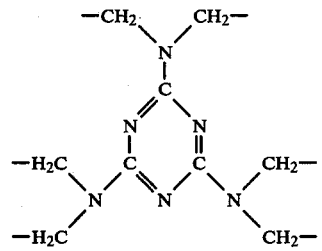

wherein at least two of the CH$_2$ groups are bonded to the oxygen atom in the crosslinked oxygen-methylmelamine bond.

4. The laminate according to claim 3, wherein the fluorine containing polymer chains are comprised of fluorine-containing monomer units and optionally copolymerized fluorine-free, ethylenically unsaturated monomer units, characterized in that the units contain oxygen bonded to methylmelamine.

5. The laminate according to claim 4, wherein the ethylenically unsaturated monomer units are derived from a hydroxyalkyl vinyl ether.

6. The laminate according to claim 1, wherein the fluoropolymer is a hydroxylated fluoropolymer crosslinked with polysilicic acid.

7. The laminate according to claim 1, wherein the fluoropolymer is a hydroxylated fluoropolymer crosslinked with methylmelamine and polysilicic acid.

8. The laminate according to either claim 6 or 7, wherein the fluoropolymer has a SiO$_2$ content of up to about 60% by weight, relative to the total weight of fluoropolymer and crosslinking agent.

9. The laminate according to claim 1, wherein the polyacrylate layer consists of polymethyl methacrylate.

10. The laminate according to claim 1, wherein the polycarbonate layer is coated on both sides.

11. The laminate according to claim 1, wherein the polyacrylate layer has a thickness of from about 0.010 to about 1.25 mm.

12. The laminate according to claim 1, wherein the coating of crosslinked fluoropolymer has a thickness of from about 0.005 to about 0.05 mm.

13. The laminate according to claim 1, wherein the polycarbonate has a mean weight-average molecular weight $\overline{M}w$ between about 10,000 and about 100,000.

14. A process for the production of a laminate comprising applying an uncrosslinked polyacrylate coating to a polycarbonate substrate and covering the polyacrylate layer with a hydroxylated fluoropolymer coating which is then crosslinked with methylmelamine, polysilicic acid or both.

15. A process for the production of a laminate comprising applying an uncrosslinked polyacrylate film to a polycarbonate substrate and covering the polyacrylate film with a hydroxylated fluoropolymer coating which is then crosslinked with at least one of methylmelamine and polysilicic acid.

16. The process of either claim 14 or 15, wherein the polyacrylate is applied to both sides of the polycarbonate substrate.

17. A process for the production of a laminate comprising applying an uncrosslinked polyacrylate film, coated with a hydroxylated fluoropolymer crosslinked with methylmelamine, to a polycarbonate substrate, so that the fluoropolymer coating forms the outer surface of the laminate.

18. The process of either claim 15 or 17, wherein the polyacrylate film is applied to the polycarbonate substrate at a temperature of at least about 160° C. and a pressure of at least about 1.4 kg/cm².

19. A laminate prepared by the process of either claims 14, 15, or 17.

* * * * *